United States Patent
Gyger

(10) Patent No.: US 6,966,491 B2
(45) Date of Patent: Nov. 22, 2005

(54) SYSTEM AND METHOD FOR DETECTING THE PASSAGE OF A PERSON OR AN OBJECT THROUGH AN ENTRY-EXIT OF DELIMITED SPACE

(75) Inventor: Thomas Gyger, Les Ponts-de-Martel (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 10/890,216

(22) Filed: Jul. 14, 2004

(65) Prior Publication Data

US 2005/0001029 A1    Jan. 6, 2005

Related U.S. Application Data

(63) Continuation of application No. PCT/EP02/13754, filed on Dec. 5, 2002.

(30) Foreign Application Priority Data

Dec. 13, 2001    (EP) .................................. 01204847

(51) Int. Cl.⁷ .............................................. G06K 5/00
(52) U.S. Cl. ...................... 235/382; 235/383; 235/384; 235/439; 235/487
(58) Field of Search ............................... 235/382, 380, 235/487, 439, 383, 384; 340/572.1, 10.34; 705/13, 26

(56) References Cited

U.S. PATENT DOCUMENTS

| | | | |
|---|---|---|---|
| 4,459,474 A | | 7/1984 | Walton |
| 4,822,990 A | * | 4/1989 | Tamada et al. ............. 235/492 |
| 5,198,807 A | * | 3/1993 | Troyk et al. ............. 340/10.34 |
| 5,805,082 A | * | 9/1998 | Hassett ....................... 340/928 |
| 6,018,641 A | * | 1/2000 | Tsubouchi et al. ......... 340/10.3 |
| 6,070,146 A | * | 5/2000 | Mimata ....................... 705/13 |
| 6,189,783 B1 | * | 2/2001 | Motomiya et al. .......... 235/375 |
| 6,313,745 B1 | * | 11/2001 | Suzuki ..................... 340/572.1 |
| 6,513,015 B2 | * | 1/2003 | Ogasawara .................. 705/26 |
| 6,679,338 B1 | * | 1/2004 | Tucker .......................... 172/6 |

FOREIGN PATENT DOCUMENTS

| | | |
|---|---|---|
| EP | 1 220 163 A1 | 7/2002 |
| EP | 1 239 421 A1 | 9/2002 |
| GB | 2 246 896 A | 2/1992 |
| WO | WO 00/67208 | 11/2000 |
| WO | WO 01/03057 A1 | 1/2001 |

* cited by examiner

OTHER PUBLICATIONS

International Search Report, completed Mar. 27, 2003.

*Primary Examiner*—Steven S. Paik
(74) *Attorney, Agent, or Firm*—Griffin & Szipl, P.C.

(57) ABSTRACT

There are described a system and a method of detecting the passage of persons or objects through an entry-exit (4) of a delimited space (2). The direction of passage is detected on the basis of the reception, by a portable electronic unit (40) with which the person or the object is equipped, of first and second electromagnetic signals (a, b) respectively transmitted in respective spatially separate and partially overlapping first and second communication regions (A, B) each crossing an entry-exit zone (32) defined by the entry-exit.

The first and second electromagnetic signals are transmitted substantially in phase at the same frequency and each comprises an identical message portion (100), one of said first and second electromagnetic signals further comprising an additional message portion (150) identifying the corresponding communication region (A, B), transmission of the other of said first and second electromagnetic signals being interrupted during the transmission of said additional message portion.

13 Claims, 3 Drawing Sheets

SYSTEM AND METHOD FOR DETECTING THE PASSAGE OF A PERSON OR AN OBJECT THROUGH AN ENTRY-EXIT OF DELIMITED SPACE

This is a National Phase Application in the United States of International Patent Application No. PCT/EP02/13754 filed Dec. 5, 2002, which claims priority on French Patent Application No. 01204847.6, filed Dec. 13, 2001. The entire disclosures of the above patent applications are hereby incorporated by reference.

FIELD OF THE INVENTION

The invention relates to the detection of persons or objects able to enter or exit a delimited space via at least one entry-exit and equipped with portable electronic units, for example electronic tickets, comprising means for receiving electromagnetic signals.

DESCRIPTION OF THE RELATED ART

The system comprises a detection device associated with the delimited space and comprising means for transmitting electromagnetic signals.

The present invention concerns more particularly a passage detection system of the above kind in which the transmission means of the detection device associated with the delimited space are adapted to transmit first and second electromagnetic signals in respective first and second spatially separated and partially overlapping communication regions, said first and second regions each crossing an entry-exit zone defined by the entry-exit of the delimited space.

A system for detecting persons or objects having the above features is disclosed in the International Application WO 01/03057 (corresponding to U.S. Ser. No. 10/009,898) in the name of the present Applicant, which is here incorporated by reference. Reference may also be had to the European Patent Application No. 1 220 163 of 03 Jul. 2002 (corresponding to U.S. Ser. No. 10/890,216 entitled "Système de detection du passage d'un individu ou objet par une entrêe-sortie á un espace délimité" ["System for detecting the passage of a person or an object through an entry-exit of a delimited space"], also in the name of the present Applicant.

Using two partially superposed electromagnetic fields advantageously enables detection of the direction in which a person or an object equipped with a portable electronic unit passes through the entry-exit. To this end, passage direction detection means are provided for detecting the direction of passage of a person or an object as a function of the reception by the electronic unit of first and second electromagnetic signals respectively transmitted in the first and second communication regions.

FIG. 1 shows diagrammatically one embodiment of the above detection system. Persons or objects are able to enter or exit a delimited space 2 (for example public transport means such as a passenger carriage or a bus) through at least one entry-exit indicated by the reference number 4. As already mentioned, a detection device is associated with a delimited space 2 and includes transmission means 8. The transmission means 8 comprise an electronic circuit 10 connected to a pair of antennas 12, 13 disposed at the entry-exit 4, the electronic circuit 10 being itself connected to a central data processing unit or onboard computer 20. The antennas 12, 13 preferably transmit at relatively low frequencies (of the order of 100 kHz) first and second electromagnetic signals, designated "a" and "b" hereinafter, in respective first and second communication regions A, B represented diagrammatically in FIG. 1. The regions A, B cross an entry-exit zone 32 of the delimited space 2 defined by the entry-exit 4. It will be noted that the detection system further comprises relatively high frequency sender-receiver means comprising at least one first sender-receiver antenna 22, 23 connected to the circuit 10.

The communication regions A and B are at least partially separate from each other and have a common or overlap zone AB indicated by shading. In practice, the overlap zone AB may be large and in particular larger than the non-superposed portions of the two communication regions A,B. Thus when a person or an object equipped with a portable electronic unit, designated 40 in FIG. 1, passes through the entry-exit 4, as shown diagrammatically by the arrow 34, or enters the zone 32, that person or object enters successively one and/or the other of the communication regions A, B. The portable electronic unit 40 with which each person or object is equipped therefore captures a succession of the first and second electromagnet signals "a", "b" transmitted by the antennas 12, 13. The order in which the succession of electromagnetic signals is received by the portable electronic unit 40 identifies the direction of passage of the person or the object through the entry-exit 4.

The robustness of this way of detecting the direction of passage depends greatly on the size of the overlap zone AB between the two communication regions A, B. Inside the overlap zone AB, the electronic unit 40 receives both the first electromagnetic signal "a" and the second electromagnetic signal "b" transmitted by the antennas 12 and 13, respectively. Determining the direction of passage of the electronic unit 40 in the overlap zone AB is therefore not possible only by identifying the electromagnetic signals received. Given the real spatial arrangement of the communication regions A, B and/or the speed at which the electronic unit 40 moves through the entry-exit 4, there is a relatively high probability that the portable electronic unit will find itself in the overlap zone AB directly or too quickly, with the result that the actual direction of passage of the portable electronic unit 40 may not be detected correctly.

Thus one object of the present invention is to improve the robustness of the detection of the direction of passage by the above system and in particular to enable reliable detection thereof, even if the portable electronic unit enters the overlap zone of the two communication regions quickly.

It will be noted that the European Patent Application No. 1 239 421 filed 11 Sep. 2002 entitled "Système de détection du passage d'individus ou objets par une entrêe-sortie à un espace délimité" ["System for detecting the passage of a person or an object through an entry-exit of a delimited space"], also in the name of the present Applicant, responds to the aim mentioned above by equipping each portable electronic unit with (i) amplitude measuring means for determining the amplitude at which the portable electronic unit receives the first and second electromagnetic signals and (ii) comparator means for comparing the amplitude at which the first electronic magnetic signal is received with the amplitude at which the second electromagnetic signal is received to determine which of the two signals has the greater amplitude.

It will be noted that the European Patent Application No. 1 239 421 (corresponding to U.S. Ser. No. 10/469,344) filed 11 Sep. 2002 entitled "Système de détection du passage d'individus ou objets par une entrêe-sortie àun espace délimité" ["System for detecting the passage of a person or an object through an entry-exit of a delimited space"], also in the name of the present Applicant, responds to the aim mentioned above by equipping each portable electronic unit with (i) amplitude measuring means for determining the amplitude at which the portable electronic unit receives the first and second electromagnetic signals and (ii) comparator means for comparing the amplitude at which the first electronic magnetic signal is received with the amplitude at which the second electromagnetic signal is received to determine which of the two signals has the greater amplitude.

Thus the present invention consists in a system with the features set out in the independent claim 1 for detecting the direction of passage of a person or an object.

BRIEF SUMMARY OF THE INVENTION

The present invention also provides a method with the features set out in the independent claim 7 of detecting the direction of passage of a person or an object.

Advantageous embodiments of the present invention form the subject matter of the dependent claims.

According to the invention, the first and second entry electromagnetic signals are transmitted substantially in phase at the same frequency and each comprises an identical message portion. One or the other of the first and second electromagnetic signals comprises an additional message portion identifying the corresponding communication region, the transmission of the other of the first and second electromagnetic signals being interrupted during the transmission of the additional message portion. As a result, the whole of the overlap zone AB shown in FIG. 1 is "assigned" to the first communication region or to the second communication region, according to whether the additional message portion is transmitted by means of the first or the second electromagnetic signal.

One advantage of the present invention is its great simplicity of implementation. The solution in accordance with the present invention necessitates no significant modification of the construction of the portable electronic unit.

Another advantage of the present invention is that it transmits a greater density of information, at a comparable frequency, than solutions previously envisaged. The earlier solutions that transmit the first and second electromagnetic signals either alternately or at different frequencies typically involve the inclusion in each of the first and second electromagnetic signals of a header intended in particular to enable synchronisation of the portable electronic unit to the signals, in order to decode them. According to the invention, transmitting the first and second electromagnetic signals in phase and at the same frequency leads to a saving in terms of transmission time equivalent to the transmission time of a header.

Other features and advantages of the present invention will become more clearly apparent on reading the following detailed description, which is given with reference to the appended drawings, which are provided by way of non-limiting example and in which:

BRIEF DESCRIPTION OF THE DRAWINGS

FIG. 2 shows diagrammatically one non-limiting embodiment of a portable unit 40 of the FIG. 1 detection system. The portable electronic unit comprises a low-frequency receiver unit 46 and an antenna 41 for receiving data transmitted by means of one or more low-frequency first electromagnetic signals "a", "b" transmitted by transmission means 8, 12, 13 of the system and a high-frequency sender-receiver unit 48 and an antenna 42 for exchanging data with high-frequency sender-receiver means (22, 23 in FIG. 1) associated with the delimited space 10 by means of a high-frequency electromagnetic signal (for example a signal at a frequency of around 100 MHz or more). The high-frequency electromagnetic signal in particular carries information relating to the direction in which the portable electronic unit 40 passes through the entry-exit 4.

DETAILED DESCRIPTION OF THE INVENTION

Figure 1:
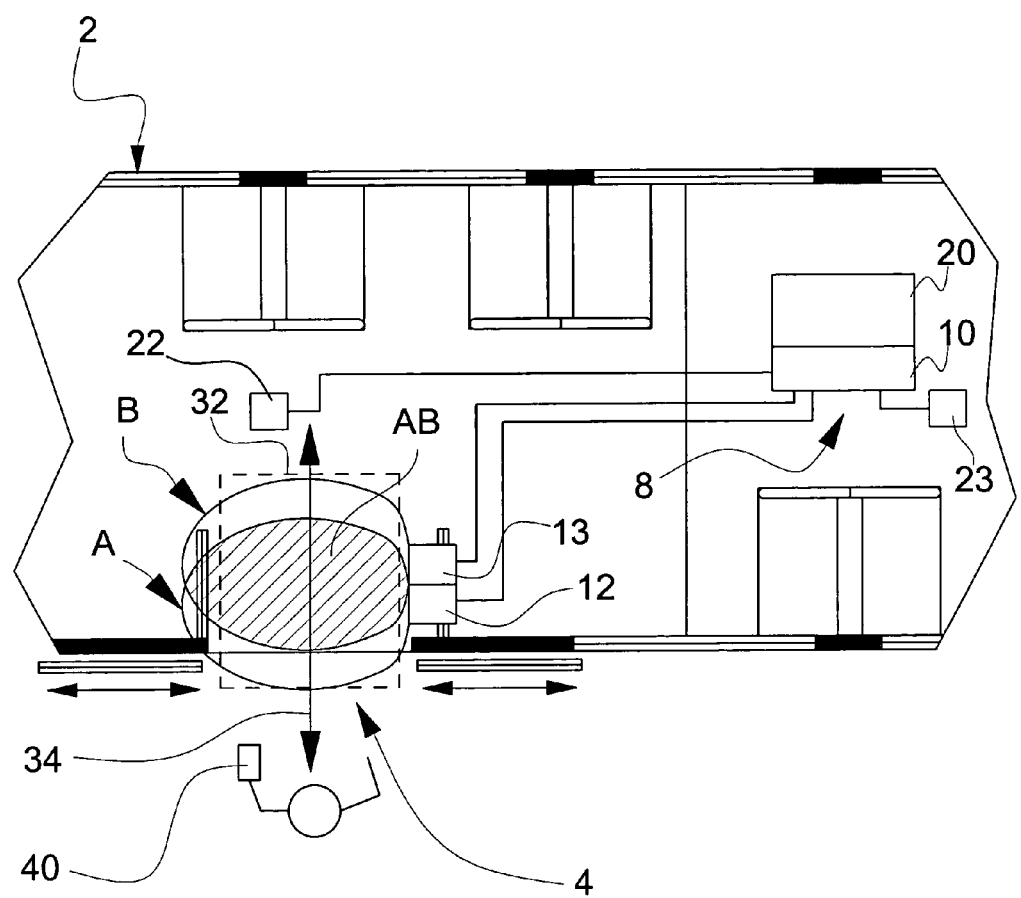
FIG. 1, already described, is a diagrammatic illustration of a passage direction detection system constituting the subject matter of the present invention.
Figure 2:
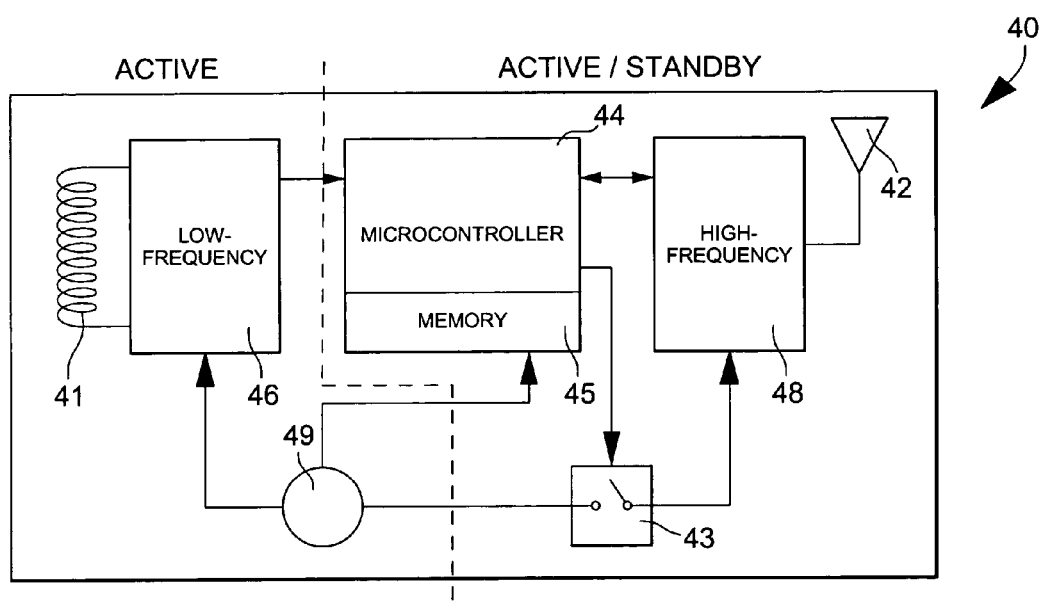
FIG. 2 shows diagrammatically one embodiment of a portable electronic unit of the FIG. 1 system.

A data processing unit 44 such as a microcontroller or a microprocessor associated with a memory 45 is connected to the low-frequency receiver unit 46 and the high-frequency sender-receiver unit 48. The portable electronic unit 40 is supplied with power by an electrical power supply 49 such as a dry cell or other form of battery. The data processing unit 44 may preferably be set to a standby mode to save power. Similarly, the high-frequency sender-receiver unit 48 may be deactivated or set to a standby mode by the data processing unit 44, as symbolised by the switch means 43. Thus only the low-frequency receiver unit 46 is powered up permanently or quasi-permanently, and it activates the data processing unit 44 as soon as the receiver unit 46 receives a low-frequency electromagnetic signal "a" or "b" transmitted by the transmission means 8, 10, 12, 13.

The structure of the portable electronic unit and the detection system are not described further. For further information see International Application WO 01/03057 (corresponding to U.S. Ser. No. 10/009,898) and European Patent Application No. 1 220 163 of 3 Jul. 2002 (corresponding to U.S. Ser. No. 10/890,216), already cited in the preamble.

It will further be noted that the direction of passage is determined by at least identifying which of the first and second electromagnetic signals "a", "b" are received first and last. It will further be understood that the direction in which the portable electronic unit 40 passes through the entry-exit may be detected entirely by the portable electronic unit, in which case the data processing unit 44 of the portable electronic unit 40 exercises the function of the direction of passage detection means and determines the direction of passage information. This direction of passage information is then sent to the detection device associated with the delimited space 2, typically by means of a high-frequency signal, as already mentioned hereinabove. This information may be sent directly after the portable electronic unit exits the first or second communication region or at the end of a particular time interval starting at its exit therefrom.

Alternatively, the portable electronic unit may merely send an indication identifying at least which of the first and second electromagnetic signals "a", "b" were received first and last, the detection device associated with the delimited space processing this data to determine the passage direction.

The first and second electromagnetic signals and their mode of transmission in one non-limiting embodiment of the present invention are described next with reference to FIG. 3. Thus, in accordance with the invention, the first and second electromagnetic signals "a", "b" are transmitted in phase at the same frequency and each comprises an identical message portion designated 100 in FIG. 3. This message portion 100 comprises, firstly, a header ("HEADER") intended in particular for synchronising the portable electronic unit. The message portion 100 comprises, secondly, a message body ("MESSAGE") containing in particular indications relating to the date and time of passage through the entry to the delimited space where the signal is transmitted, the identity of the delimited space concerned (for example of a vehicle, a railway carriage, a metro train, etc.), as well as other complementary indications such as the identity of the station or of the stop at which the vehicle is stopped or configuration parameters of the portable electronic unit.

According to the invention, one of the first and second electromagnetic signals comprises an additional message portion identifying one of the communication regions A, B, the transmission of the other of the first and second electromagnetic signals being interrupted during the transmission of this additional message portion. Thus in the FIG. 3 example the first electromagnetic signal "a" comprises an additional message portion 150 identifying the first communication region A. The transmission of the second electromagnetic signal "b" is interrupted during the transmission of this additional message portion 150.

Given that the message portions 100 of the first and second electromagnetic signals "a", "b" are identical and that only the first electromagnetic signal "a" (or alternatively the second electromagnetic signal "b") comprises the additional message portion 150, it is obvious that there is therefore no interference between the two electromagnetic signals "a" and "b".

Figure 3:
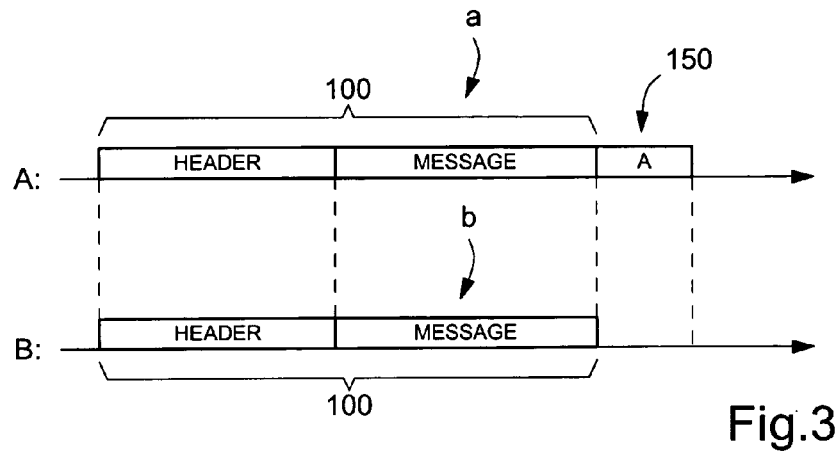
FIG. 3 shows the first and second electromagnetic signals and their mode of transmission in one non-limiting embodiment of the present invention.
Figure 4:
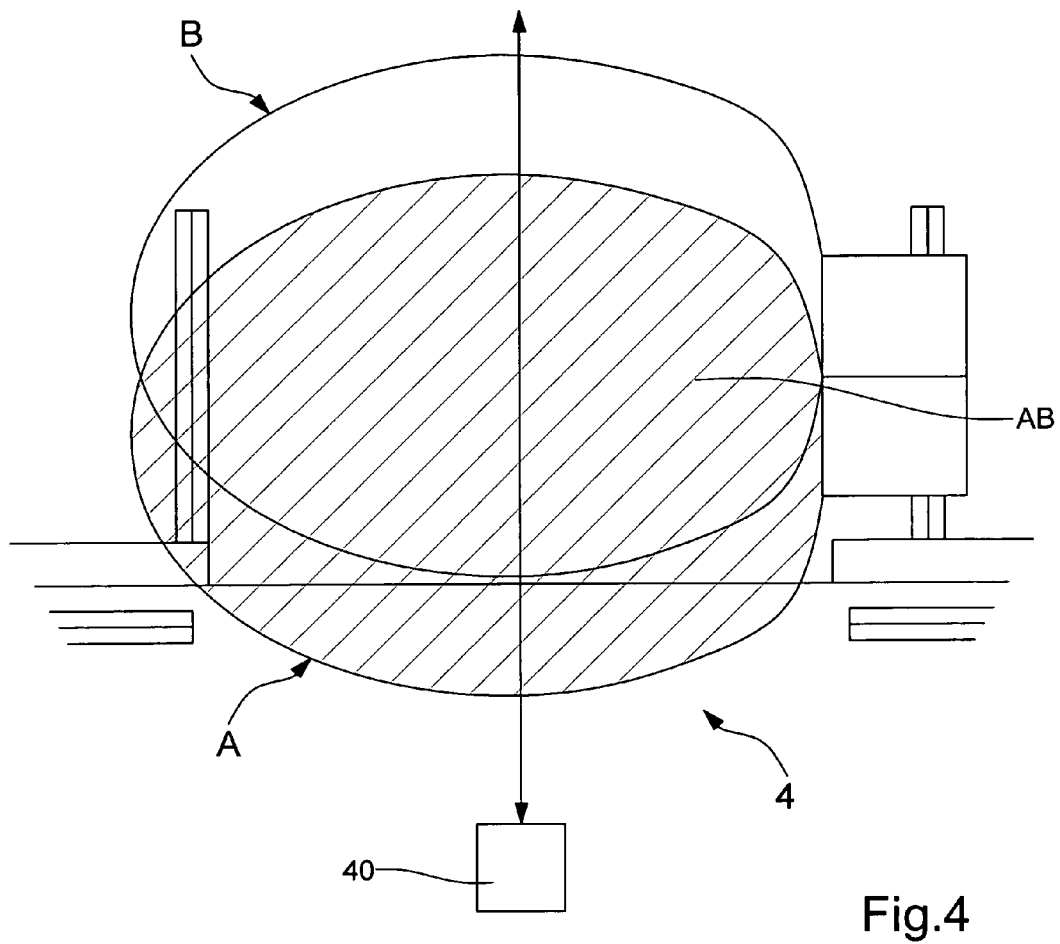
FIG. 4 illustrates diagrammatically the assignment of the overlap zone of the communication regions resulting from the FIG. 3 embodiment.

As shown diagrammatically in FIG. 4, the specific solution from FIG. 3 results in the overlap zone AB of the two communication regions A and B being "assigned" to the communication region A situated toward the exterior of the delimited space 2. A portable electronic unit 40 in the communication region A, including the overlap zone AB, therefore receives a message comprising both the message portion 100 and the additional message portion 150 identifying the communication region A. The portable electronic unit 40 then treats this information as indicating that it is in the communication region A. As soon as the portable electronic unit 40 finds itself in the communication region B, outside the overlap zone AB, it no longer receives the additional message portion 150. Consequently, the portable electronic unit 40 treats this information as indicating that it is in the communication region B.

In practice, it is beneficial to arrange and dispose the antennas transmitting the low-frequency electromagnetic signals to maximise and optimise the reception of each electromagnetic signal. In the present instance, it is therefore advisable to maximise and optimise the size of the portion of the communication region B that is outside the overlap zone AB, to ensure that a portable electronic unit passing through the entry-exit receives at least once the electromagnetic signal transmitted in the communication region B. This optimisation depends in particular on the transmission frequency of the electromagnetic signals "a", "b", the duration of the messages transmitted, and the speed at which the portable electronic unit passes through the entry.

Obviously, the choice may be made to assign the overlap zone AB to the communication region B instead of assigning it to the communication region A, as described with reference to FIGS. 3 and 4. The assignment could even change in time, if that were to prove necessary. For example, in the European Patent Application No. 1 220 163 of 3 Jul. 2002 (corresponding to U.S. Ser. No. 10/890,216) already cited in the preamble, there is provision for modifying the entry electromagnetic signals after closure of the entry-exit, and in particular for modifying the first electromagnetic signal "a" transmitted in the communication region A situated toward the exterior of the delimited space 2 so that it becomes identical to the second electromagnetic signal "b". In the present instance, this amounts to interrupting the transmission of the additional message portion 150 after closure of the entry-exit.

Finally, it is obvious that diverse modifications and/or improvements that will be evident to the person skilled in the art may be made to the embodiments described herein without departing from the scope of the invention as defined by the appended claims. Clearly the additional message portion 150 for assigning the overlap zone AB to one or the other of the communication regions A, B could be transmitted at any other time, rather than at the end of the electromagnetic signal, as shown in FIG. 3. The message portion 100 could therefore be interrupted to allow the transmission of the additional message portion 150, the transmission of the other electromagnetic signal obviously still being interrupted during this period.

What is claimed is:

1. A system for detecting the passage of a person or an object through an entry-exit of a delimited space, the system comprising:
   a detection device associated with said delimited space and comprising transmission means for transmitting first and second electromagnetic signals in respective spatially separate and partially overlapping first and second communication regions each crossing an entry-exit zone defined by said entry-exit;
   a portable electronic unit adapted to equip said person or object and comprising receiver means for receiving said first and second electromagnetic signals transmitted by said transmission means; and
   means for detecting the direction of passage through said entry-exit of a person or an object equipped with a portable electronic unit as a function of the reception of said first and second electromagnetic signals,
   wherein said first and second electromagnetic signals are transmitted substantially in phase at the same frequency and each comprises an identical message portion, one of said first and second electromagnetic signals further comprising an additional message portion identifying the corresponding communication region, transmission of the other of said first and second electromagnetic signals being interrupted during the transmission of said additional message portion.

2. The detection system according to claim 1, wherein said first and second communication regions are respectively toward the exterior and toward the interior of said delimited space and said first electromagnetic signal comprises said additional message portion identifying the first communication region.

3. The detection system according to claim 2, wherein the transmission of said additional message portion is interrupted after closure of said entry-exit.

4. The detection system according to claim 1, wherein said first and second communication regions are respectively toward the exterior and toward the interior of said delimited space and said second electromagnetic signal comprises said additional message portion identifying the second communication region.

5. The detection system according to claim 1, wherein said passage direction detection means comprise means in said detection device associated with the delimited space for processing said first and second electromagnetic signals.

6. The detection system according to claim 1, wherein said passage direction detection means comprise means in said portable electronic unit for processing said first and second electromagnetic signals.

7. A method of detecting the passage of a person or an object through an entry-exit of a delimited space, the method comprising:

transmitting first and second electromagnetic signals in respective spatially separate and partially overlapping first and second communication regions each crossing an entry-exit zone defined by said entry-exit;

receiving said first electromagnetic signal and/or said second electromagnetic signal by means of a portable electronic unit adapted to equip said person or object; and detecting the direction of passage through said entry-exit of a person or an object equipped with the portable electronic unit as a function of the reception of said first and second electromagnetic signals, wherein said first and second electromagnetic signals are transmitted substantially in phase at the same frequency and each comprises an identical message portion, one of said first and second electromagnetic signals further comprising an additional message portion identifying the corresponding communication region, transmission of the other of said first and second electromagnetic signals being interrupted during the transmission of said additional message portion.

8. The detection method according to claim 7, wherein detecting the direction of passage through the entry-exit comprises determining the corresponding communication region as a function of the reception of said additional message portion.

9. The detection method according to claim 8, wherein detecting the direction of passage through the entry-exit comprises transmitting from said portable electronic unit to a detection device associated with said delimited space information comprising at least an identification of the communication region corresponding to the first of the electromagnetic signals received and the communication region corresponding to the last of the electromagnetic signals received.

10. The detection method according to claim 9, wherein said transmission of information from the portable electronic unit to said detection device associated with the delimited space is effected directly after or at the end of a particular time interval following the exit of the portable electronic unit from said first or second communication region.

11. The detection method according to claim 9, wherein said information is transmitted from the portable electronic unit to said detection device associated with the delimited space at a relatively high frequency that is higher than the transmission frequency of said first and second electromagnetic signals.

12. The detection method according to claim 8, wherein detecting the direction of passage through the entry-exit comprises transmitting from said portable electronic unit to a detection device associated with said delimited space passage direction information determined by said portable electronic unit at least on the basis of an identification of the communication region corresponding to the first of the electromagnetic signals received and the communication region corresponding to the last of the electromagnetic signals received.

13. The detection method according to claim 7, wherein said first and second communication regions are respectively toward the exterior and toward the interior of said delimited space and said first electromagnetic signal comprises said additional message portion identifying the first communication region, the transmission of said additional message portion being interrupted after closure of said entry-exit.

* * * * *